US008645589B2

(12) United States Patent
Scorsi et al.

(10) Patent No.: US 8,645,589 B2
(45) Date of Patent: Feb. 4, 2014

(54) METHODS FOR DATA ACQUISITION SYSTEMS IN REAL TIME APPLICATIONS

(75) Inventors: Rafael Castro Scorsi, Round Rock, TX (US); Hector Rubio, Austin, TX (US); Daniel Domene, Austin, TX (US)

(73) Assignee: National Instruments Corporation, Austin, TX (US)

( * ) Notice: Subject to any disclaimer, the term of this patent is extended or adjusted under 35 U.S.C. 154(b) by 366 days.

(21) Appl. No.: 12/534,600

(22) Filed: Aug. 3, 2009

(65) Prior Publication Data
US 2011/0029101 A1 Feb. 3, 2011

(51) Int. Cl.
*G06F 13/28* (2006.01)
(52) U.S. Cl.
USPC .......................................................... 710/22
(58) Field of Classification Search
USPC .......................................................... 710/22
See application file for complete search history.

(56) References Cited

U.S. PATENT DOCUMENTS

| 5,285,323 | A | * | 2/1994 | Hetherington et al. | 711/122 |
| 5,551,005 | A | * | 8/1996 | Sarangdhar et al. | 711/145 |
| 5,842,006 | A | | 11/1998 | Harvey et al. | |
| 6,640,312 | B1 | * | 10/2003 | Thomson et al. | 714/5.11 |
| 2004/0044811 | A1 | * | 3/2004 | Vrancic | 710/53 |
| 2006/0179179 | A1 | * | 8/2006 | Suzuoki | 710/22 |
| 2008/0043826 | A1 | | 2/2008 | Castro et al. | |
| 2009/0115436 | A1 | * | 5/2009 | Koehler et al. | 324/698 |
| 2011/0026664 | A1 | | 2/2011 | Castro et al. | |
| 2011/0029691 | A1 | | 2/2011 | Scorsi et al. | |

OTHER PUBLICATIONS

U.S. Appl. No. 12/753,651, entitled "Synchronization of Converters Having Varying Group-Delays in a Measurement System", by Adam H. Dewhirst and Rafael Castro Scorsi, filed Apr. 2, 2010; 41 pages.

\* cited by examiner

*Primary Examiner* — Henry Tsai
*Assistant Examiner* — Juanito Borromeo
(74) *Attorney, Agent, or Firm* — Meyertons Hood Kivlin Kowert & Goetzel, P.C.; Jeffrey C. Hood

(57) ABSTRACT

A system may include a processing unit executing program instructions (SW), a data acquisition (DAQ) hardware device for acquiring sample data and/or generating control signals, and host memory configured to store data samples and various data associated with the DAQ and processor operations. The DAQ device may push HW status information to host memory upon being triggered by predetermined events taking place in the DAQ device, e.g. timing events or interrupts, to avoid or reduce SW reads to the DAQ device. The DAQ device may update dedicated buffers in host memory with status data on any of these events. The status information pushed to memory may be read in a manner that allows detection of race conditions. Interrupts generated by the DAQ device may be similarly handled. Upon generating an interrupt, the DAQ device may gather information required to handle the interrupt, and push the information into system memory, along with information identifying the interrupt. SW may read system memory for this information, and handle the interrupts as required without having to query the DAQ device.

19 Claims, 5 Drawing Sheets

METHODS FOR DATA ACQUISITION SYSTEMS IN REAL TIME APPLICATIONS

BACKGROUND OF THE INVENTION

1. Field of the Invention

This invention relates generally to measurement and data acquisition systems and, more particularly, to improving data acquisition in real-time applications.

2. Description of the Related Art

Measurement systems are oftentimes used to perform a variety of functions, including measurement of a physical phenomena, measurement of certain characteristics or operating parameters of a unit under test (UUT) or device under test (DUT), testing and analysis of physical phenomena, process monitoring and control, control of mechanical or electrical machinery, data logging, laboratory research, and analytical chemistry, to name a few examples.

A typical contemporary measurement system comprises a computer system, which commonly features a measurement device, or measurement hardware. The measurement device may be a computer-based instrument, a data acquisition device or board, a programmable logic device (PLD), an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system through a PCI bus, PXI (PCI extensions for Instrumentation) bus, a USB (Universal Serial Bus), a GPIB (General-Purpose Interface Bus), a VXI (VME extensions for Instrumentation) bus, a serial port, parallel port, or Ethernet port of the computer system. Optionally, the measurement system includes signal-conditioning devices, which receive field signals and condition the signals to be acquired.

A measurement system may typically include transducers, sensors, or other detecting means for providing "field" electrical signals representing a process, physical phenomena, equipment being monitored or measured, etc. The field signals are provided to the measurement hardware. In addition, a measurement system may also typically include actuators for generating output signals for stimulating a DUT or for influencing the system being controlled. These measurement systems, which can be generally referred to as data acquisition systems (DAQs), are primarily used for converting a physical phenomenon (such as temperature or pressure) into an electrical signal and measuring the signal in order to extract information. PC-based measurement and DAQs and plug-in boards are used in a wide range of applications in the laboratory, in the field, and on the manufacturing plant floor, among others.

Multifunction DAQ devices typically include digital I/O capabilities in addition to the analog capabilities described above. Digital I/O applications may include monitoring and control applications, video testing, chip verification, and pattern recognition, among others. DAQ devices may include one or more general-purpose, bidirectional digital I/O lines to transmit and receive digital signals to implement one or more digital I/O applications. DAQ devices may also include a Source-Measure Unit (SMU), which may apply a voltage to a DUT and measure the resulting current, or may apply a current to the DUT and measure the resulting voltage.

Typically, in a measurement or data acquisition process, analog signals are received by a digitizer, which may reside in a DAQ device or instrumentation device. The analog signals may be received from a sensor, converted to digital data (possibly after being conditioned) by an Analog-to-Digital Converter (ADC), and transmitted to a computer system for storage and/or analysis. Then, the computer system may generate digital signals that are provided to one or more digital to analog converters (DACs) in the DAQ device. The DACs may convert the digital signal to an output analog signal that is used, e.g., to stimulate a DUT or to influence the system being controlled. In order for a DAQ system to operate as efficiently as possible, it is generally desirable to optimize the process of obtaining (sampling) the input signals and outputting the control/feedback signals. For example, it may be beneficial to minimize the time a processor in the computer system spends attending to the acquisition and generation of the data, and maximize the time it spends executing instructions directed at other tasks, for example performing control algorithm calculations.

Other corresponding issues related to the prior art will become apparent to one skilled in the art after comparing such prior art with the present invention as described herein.

SUMMARY OF THE INVENTION

In one set of embodiments, a system may include a processing unit executing program instructions (i.e. software; SW), a data acquisition (DAQ) hardware device for acquiring sample data and/or generating control signals, and host memory configured to store data samples and various other data associated with the DAQ and processor operations. The DAQ device may be configured to push HW status information to host memory on predetermined events in the DAQ device, in order to avoid or reduce SW reads to the DAQ device. The status pushing may be triggered by timing events such as a sample clock, or by interrupts such as an error condition. The DAQ device may update dedicated buffers and/or registers in host memory with status data on any of these events. The status information pushed to memory may be read in a manner that allows detection of race conditions. In one set of embodiments, the system may be configured to allow the detection of incoherent data when writing into host memory by the DAQ device and reading from the host memory by SW are performed asynchronously and are not atomic. Status data (information) may be placed between two memory locations containing a count of the DAQ HW updates to memory (status pushes). When the DAQ device writes the memory, it may write the data in a given order (e.g. ascending address order). When SW reads the data, then it may read in the opposite order (e.g. descending address order). If after reading the data the two count values match, the data may be considered coherent. If they don't match, the data may be deemed unreliable because the DAQ device may have overwritten some of it with a new update. SW may therefore need to repeat the operation.

Sentinel bits (data) may also be used in the data stream (which may be a DMA stream) in conjunction with status pushing. The data stream returning the acquired data (also referred to as sample data or data samples) from the DAQ device to system memory may include a sentinel word at the end of each data sample aggregate. This same sentinel word may be status pushed (transmitted to in response to having acquired sample data and/or in response to having generated control data) to another location in memory (though it may be part of a same buffer/register). The word may contain a sample count and error status. The sample count may be used as a reference to indicate to SW (executing on a system processor) the location of the latest data within the DMA buffer. SW may wait for the status push memory to advance to the next sample, and then inspect the DMA buffer in the expected location until the data is available. The SW may therefore access the status information and sample data without having to access the DAQ HW. Since the SW may always have a pointer to the latest sample without the need to traverse the buffer, the process will be deterministic even in the event of missing samples.

In one set of embodiments, a counter may also be used for the sentinel bit/status push indicator to remove the need for SW to clear the buffer. Controlling the size of the DMA buffer may guarantee that no sentinel will be repeated in the same location for a reasonable amount of time and without the sentinel being detected in any other way. Furthermore, a sentinel/status push counter may be used by SW to detect latency errors. SW may expect the count value, which was pushed by the DAQ HW as part of the status information, to increment on each iteration. If the counter increments by more than a specified count value (e.g. a single count value, or one), the iteration may not be keeping synchronization with the HW sample clock (too slow). When reading the data, the count that was pushed by the DAQ HW may point to the location of the latest acquired sample. When SW reads this sample, it may also inspect the location of the next (subsequent) sample. If the sample is already there, then it may be, again, an indication of SW not keeping synchronization with the DAQ HW.

Status pushing may also be used along with MSI (message signaled interrupt) to implement an interrupt service routine that does not require SW to read/access the DAQ HW device. For optimum effectiveness, the order in which status information (data) is pushed into the specified location in memory and the MSI interrupt is generated may be specified. The DAQ HW device may transmit the data required by the SW to service the interrupt ahead of the MSI notification, guaranteeing that when SW is notified of the interrupt, the data required for the interrupt service routine to service the interrupt is already in memory. The DAQ HW may also be configured to control the flow of the MSI packets without losing any of those packets.

In one set of embodiments, multiple HW interrupts may be controlled by different threads of SW, requiring a mechanism to maintain synchronization between SW (executing on a system processor) and the DAQ HW. The system may be configured to allow SW to perform certain operations related to the servicing of the interrupts. For example, three such operations may be specified: enable, disable and acknowledge. One or more registers may be defined/specified to allow enable and disable operations to be performed simultaneously with the acknowledge operation. The DAQ HW may be configured to execute both operations in the required order when both operations are requested simultaneously. For example, a disable/acknowledge operation may be issued as a single request, but DAQ HW may perform the disable before acknowledge. Similarly, an enable/acknowledge operation may be issued as a single request, but DAQ HW may perform the acknowledge before the enable. These registers may be configured to allow the request of these operations for multiple interrupts in the same register. The register may also be configured to allow multiple subsequent accesses from different threads of SW servicing different interrupts without these instructions interacting with each other.

In one set of embodiments, error reporting may be configured to allow fast recovery while ensuring that all errors are properly handled. The DAQ HW may be configured with several mechanisms for detecting different errors depending on the measurement. For example, when a sample clock is issued and an output resource hasn't received the required data for it, the DAQ HW may generate a first type of error notification, which may be referred to as a sticky error notification. The error notifications may remain asserted until acknowledged by the SW. The DAQ HW may also generate a second type of error notification, which may be referred to as a non-sticky error notification. The non-sticky error may be used to notify SW that there was an error on the current sample clock, while allowing the SW to try to recover from the error condition. If the data arrives on time on the next sample clock, the DAQ HW may not assert the non-sticky error, even when the sticky error has not been acknowledged.

In one set of embodiments, DAQ HW may be configured to respond to loss of synchronization between SW and HW in a variety of ways. For example, one way SW (executing on the system processor) and the DAQ HW may fall out of synchronization with respect to each other in an output operation is when SW writes too fast with respect to the sample clock. In some cases it may be desirable for the SW to continue running during the output operation without synchronizing to the DAQ HW on every cycle (e.g. operating in an open loop), where the SW may get ahead of the DAQ HW and attempt to write a new sample before the previous sample has been processed. The DAQ HW may be required to detect this condition and report it to SW as an error (sticky error and/or non sticky error), prevent corrupted data from going out to the user, and, depending on the desired behavior, discard one set of data. In one embodiment, the system may be configured with a first option (which may be referred to as "write newest") in which case the DAQ HW may discard the previous data, and a second option (which may be referred to as "write oldest") in which case the DAQ HW may discard the new data. A preferred option may be selected/specified based on system considerations and operating needs as they arise. Another way SW and the DAQ HW may fall out of synchronization with respect to each other in an output operation is when SW writes too slowly with respect to the sample clock. For example, data to an output resource may not arrive on time for the next sample clock (this may include writing a partial sample aggregate). DAQ HW may be configured to detect such a condition as an overrun error. Upon detecting this condition, the DAQ HW may prevent the corrupted or incoherent data from being output to the user, allowing stopping as well as continuing after the error, and reporting the error as a sticky error and non-sticky error.

Data transfers to all HTSP (hardware timed single point) counter output operations, such as PWM may also be optimized. When using a counting device to generate a pulse width modulated output (PWM) as the control signal for an HTSP loop, a SW/HW synchronization problem may arise. Because of the nature of the PWM output, whenever the sample clock happens, the counter may not be able to immediately adjust the characteristics of the pulse. The counter may need to complete generating the current pulse before updating/adjusting the output to reflect the new pulse train specification. Counters using only two banks for data, one for the current data output and one for the next pulse to be generated may require SW to take extra steps for synchronizing with the DAQ HW, usually resulting in additional HW accesses and/or interrupts, to prevent overwriting any of the buffers that are still holding required data. In one set of embodiments, counters may be configured to use an additional bank of data, for a total of at least three banks of data. When a sample clock is issued, SW may immediately write to additional bank. The DAQ HW may subsequently copy/transfer this data to the appropriate bank after implementing the bank switch, as well as reporting all overrun or writes too fast errors arising from the software writing out of synchronization.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
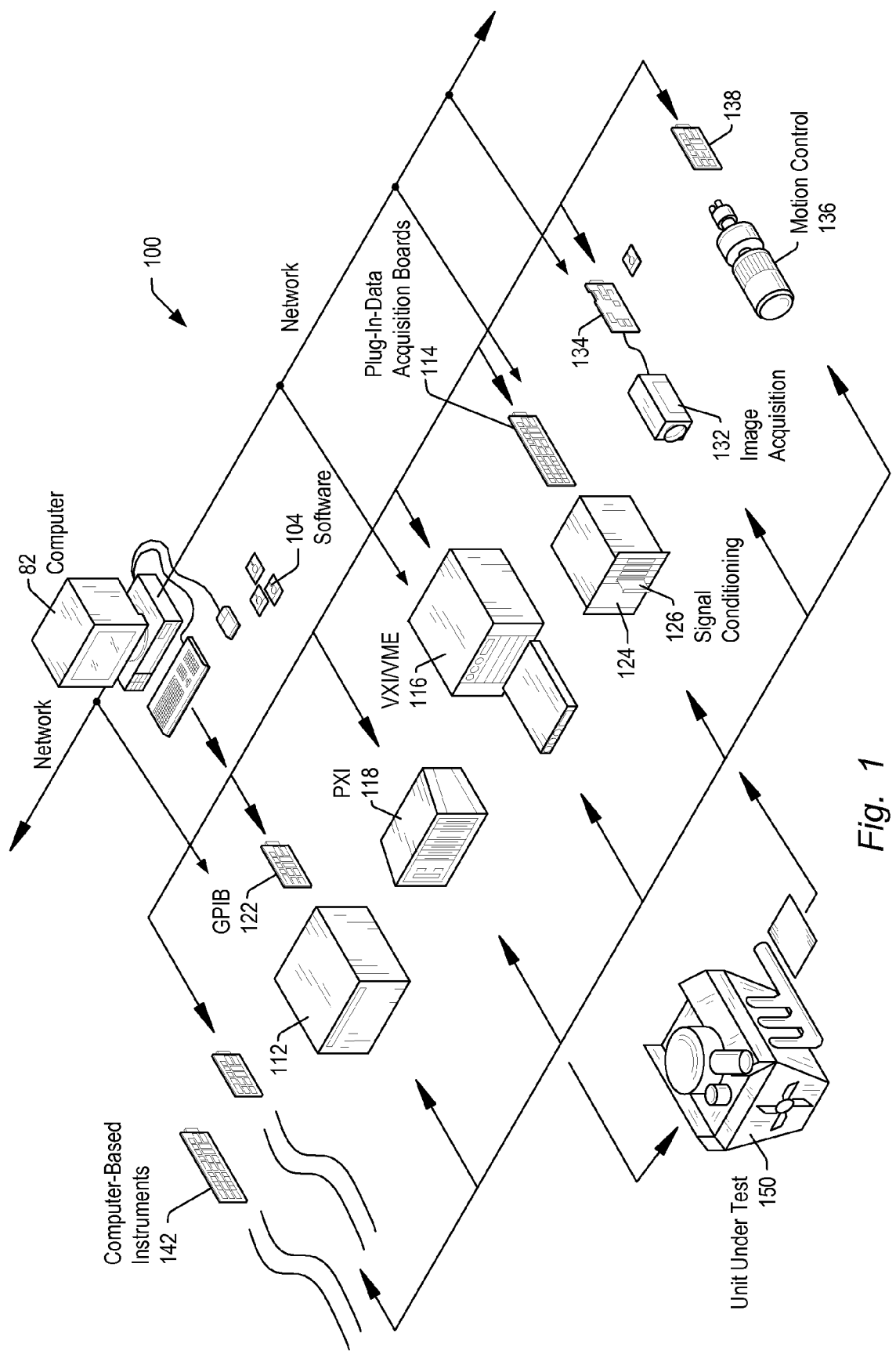
FIG. 1 shows an instrumentation control system with instruments networked together according to one set of embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE EMBODIMENTS

Embodiments of the present invention may be used in systems configured to perform test and/or measurement functions, to control and/or model instrumentation or industrial automation hardware, or to model and simulate functions, e.g., modeling or simulating a device or product being developed or tested, etc. However, it is noted that the present invention may equally be used for a variety of applications, and is not limited to the applications enumerated above. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc.

FIG. 1 illustrates an exemplary instrumentation control system 100 which may be configured according to embodiments of the present invention. System 100 comprises a host computer 82 which may couple to one or more instruments configured to perform a variety of functions using timing control implemented according to various embodiments of the present invention. Host computer 82 may comprise a CPU, a display screen, memory, and one or more input devices such as a mouse or keyboard as shown. Computer 82 may operate with one or more instruments to analyze, measure, or control a unit under test (UUT) or process 150. The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments. The instruments may be coupled to the unit under test (UUT) or process 150, or may be coupled to receive field signals, typically generated by transducers. System 100 may be used in a data acquisition and control applications, in a test and measurement application, an image processing or machine vision application, a process control application, a man-machine interface application, a simulation application, or a hardware-in-the-loop validation application, among others.

Figure 2:
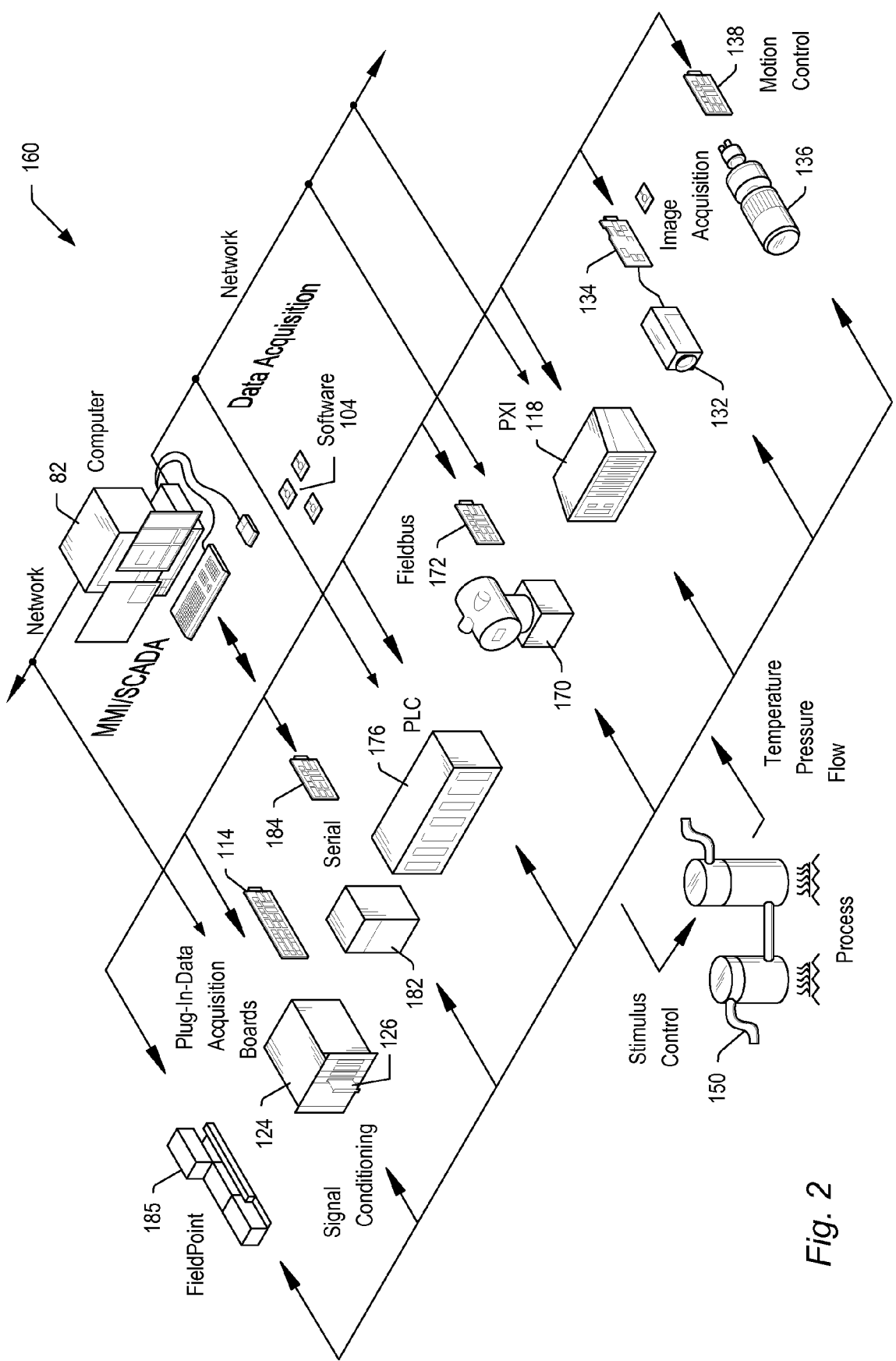
FIG. 2 shows an industrial automation system with instruments networked together according to one set of embodiments.

FIG. 2 illustrates an exemplary industrial automation system 160 that may be configured according to embodiments of the present invention. Industrial automation system 160 may be similar to instrumentation or test and measurement system 100 shown in FIG. 1. Elements that are similar or identical to elements in FIG. 1 have the same reference numerals for convenience. System 160 may comprise a computer 82 which may couple to one or more devices and/or instruments configured to perform a variety of functions using timing control implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 150.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a field bus device 170 and associated field bus interface card 172, a PLC (Programmable Logic Controller) 176, a serial instrument 182 and associated serial interface card 184, or a distributed data acquisition system, such as the Compact FieldPoint or CompactRIO systems available from National Instruments, among other types of devices. In some embodiments, similar to the system shown in FIG. 1, the computer system may couple to one or more of the instruments/devices via a network connection, such as an Ethernet connection, which may facilitate running a high-level synchronization protocol between the computer system and the coupled instruments/devices.

In one set of embodiments, data acquisition (for example through the use of plug-in DAQ boards 114) may be performed according to a general hardware-timed single point method. This method may involve at least one input component with one output component sharing a CPU independent clock (HW-timed). The data sent to the output component during any given sample clock period may be generated as a function of the data acquired with the input component during the previous sample clock period. Therefore, the data may be generated one sample at a time (single point) and may not be accumulated in a first-in-first-out buffer (FIFO). The CPU may generate the output data using the input data from a first sample clock (i.e. on the rising edge of a first sampling clock period) and send it to the output module before the next sample clock (i.e. a second sampling clock period) takes place. The DAQ board may be configured to identify and report the appropriate errors if these conditions are not met at any time. The board and the CPU may also be configured to take advantage of all the possible resources in order to minimize the time needed to transfer data between each other, optimizing the time that the CPU uses to compute the output data and maximizing the possible sample clock frequency for the system. This mode of operation may be referred to as Hardware Timed Single Point (HTSP) mode of operation.

Figure 3:
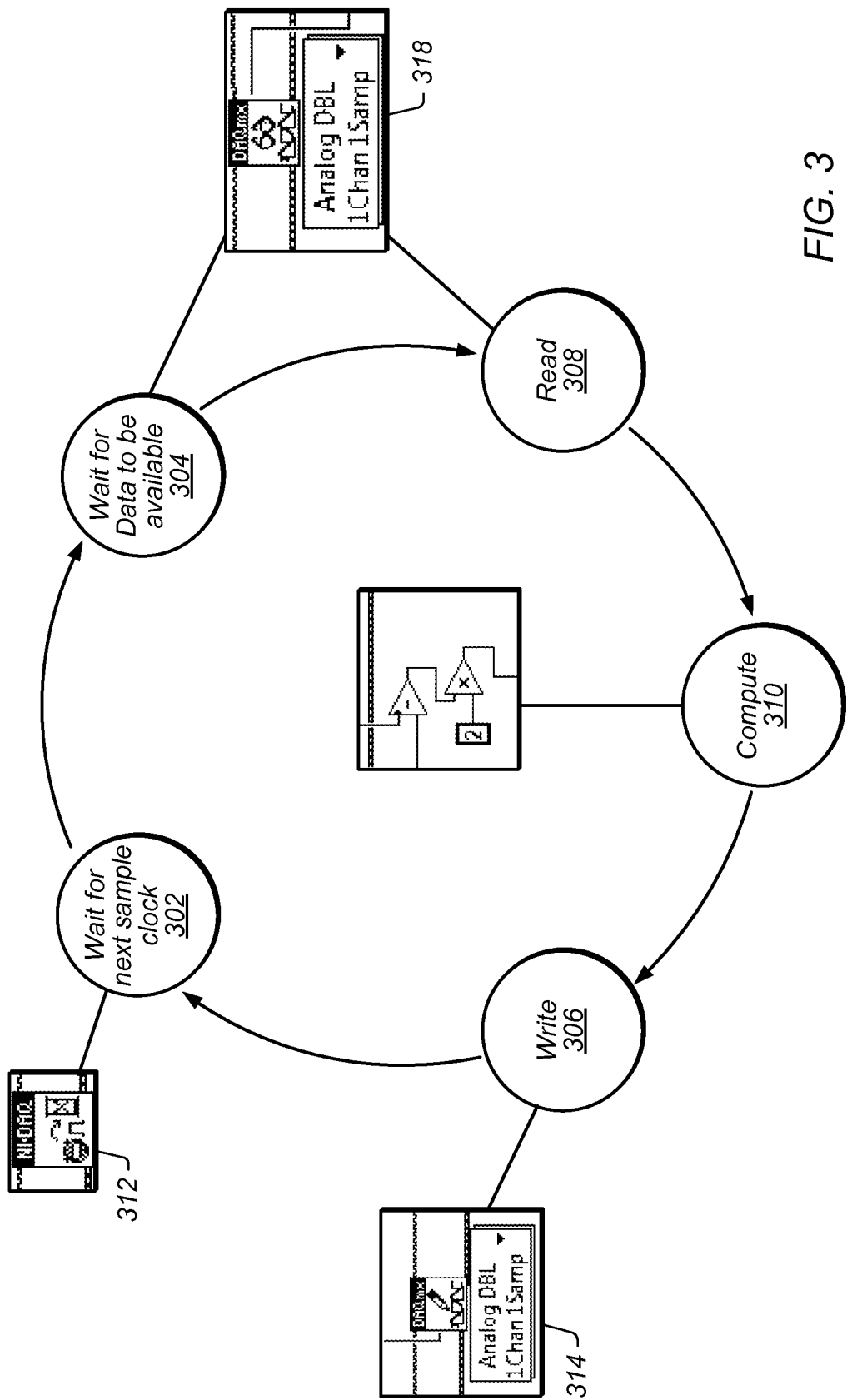
FIG. 3 shows a typical HTSP (hardware timed single point) application in use, for example in a control loop.

FIG. 3 shows one embodiment of an HTSP application in use, for example, in a control loop. As shown in FIG. 3, there may be one or more input resources, each with one or more channels. These input resources may measure the state of the device under control (DUC) or device under test (DUT) at a given time. This time may be defined by a sample clock signal, which may be generated by a HW device (for example, by one of the input resources 312), and may be a periodic signal with low jitter (i.e. low period variation). Input resources may wait for the next sample clock (302), and for data to become available (304). Once input data is available and they are provided with the sample clock, the input resources may take a sample of their inputs and start a conversion to digital (318). This conversion may take any amount of time depending of the nature or the signal being measured. As the samples are ready, the input resource may transfer the data to host memory (308) to make the data available to the processor. When all the samples are in memory, the processor may be notified so it may begin processing the data (310). This process may result in the data that will be output by the output resources on the next (or subsequent) sample clock. Once the processor finished this process, it may transfer the data (306) to the output resources (e.g. 314). This transfer may complete with enough time left for the output resources to output the data on the next sample clock. It may be desirable to minimize processor time required for the acquisition and generation of the data, to maximize processor time available to perform other tasks, for example to perform the control algorithm calculations (310).

Several mechanisms may exist to transfer data from the input resources to the host memory. The most efficient mechanism may be direct memory access (DMA) because it doesn't require the processor for the data transfer. However, even when using DMA, the processor may need to be notified by the DAQ HW when the data is available in memory for it to use. Present methods using DMA transfers include interrupts, or insertion of special words (called sentinels) in the data stream after each sample. One disadvantage of interrupts is the significant attention they require from the processor which needs to handle the interrupt. Previous implementations of sentinel bits relied on pre-initializing the memory with a known value of the sentinel, and having the input resource (from DAQ HW) overwrite the memory with a different value when the sample was available. While this method minimizes SW (software) accesses to the DAQ HW (hardware) device, it may become highly indeterministic in situations when SW is late and several samples have accumulated. Furthermore, SW may be required to traverse all the memory locations until it finds the last location that still contains the initialization value. In addition, SW may also be required to fill the buffer with the initialization value again. The more SW falls behind, the more locations may need to be written.

Status Pushing

Figure 4A:
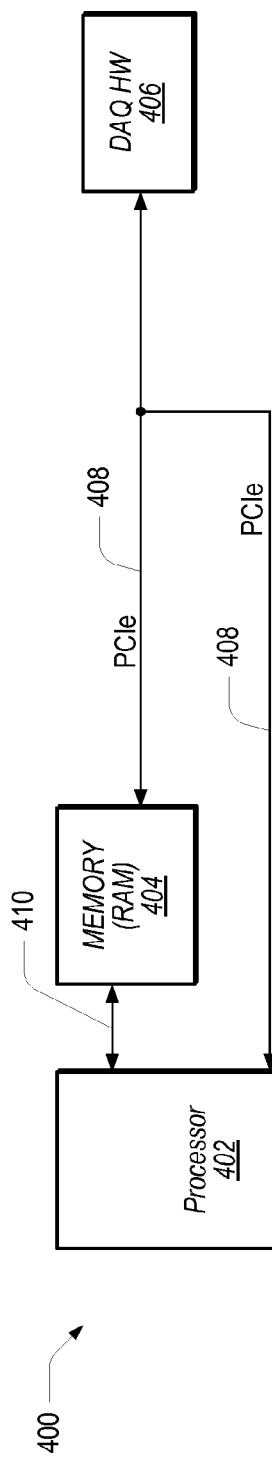
FIG. 4a shows a simplified diagram of an instrumentation system including a processing unit, system memory, and data acquisition (DAQ) hardware (HW)

One possible solution to the above problem may be the introduction of Status Pushing technology, where HW information may be written to host memory by the DAQ HW on predetermined events that take place in the DAQ HW, in order to substantially reduce or eliminate required SW reads to the DAQ device. The status pushing (i.e. the writing of status data to the memory) may be triggered by timing events such as a sample clock, or by interrupts such as an error condition. In one set of embodiments, the DAQ HW may update the host memory on any of these events. An exemplary computer system 400 is shown in FIG. 4a (only the relevant portions of the computer system are shown), including a processing unit 402 (e.g. a microprocessor) coupled to a system memory 404 (e.g. a RAM, such as a DRAM) via a local memory bus 410 to read/write memory 404. Processor 402 may also be coupled to DAQ HW 406 via a secondary bus, e.g. a PCIe bus (which may be slower than bus 410). DAQ HW may contain input and output resourced for performing data acquisition and/or control. DAQ HW 406 may also be configured to write/push status information into memory 404 via bus 408 through a bus interface that may be configured within DAQ HW 406. In one embodiment, memory 404 may include a dedicated register associated with DAQ HW 406, to send notifications and data to SW executing on processor 402, triggered by different events related to DAQ operations. For example, DAQ HW 406 may transmit status information of the operation and the value of a counter to the dedicated buffer any time DAQ HW 406 detects a new sample clock.

Figure 4B:
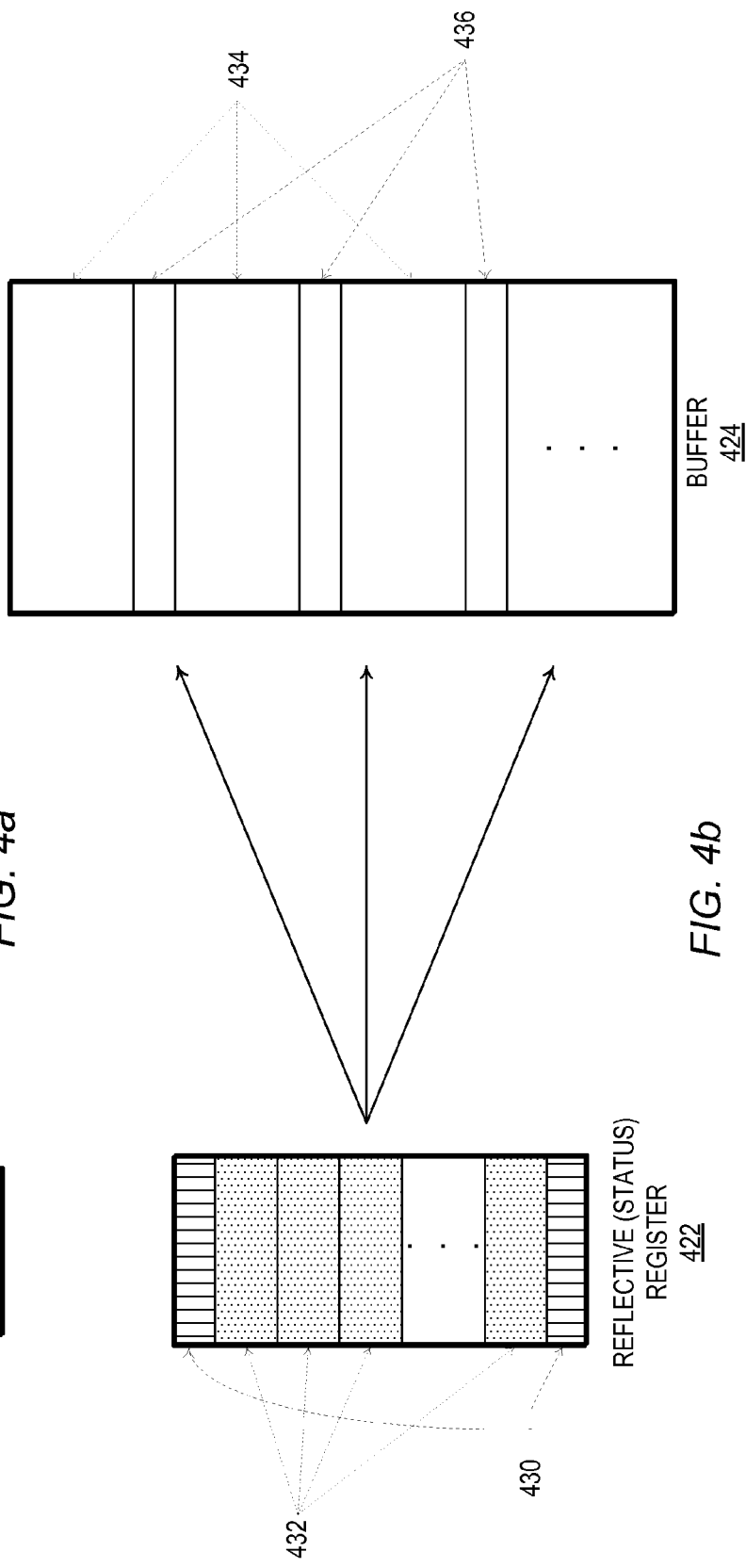
FIG. 4b shows a diagram of a status register and data buffer configured in the system memory according to one embodiment.

One example of a reflective (or status) register 422 is shown in FIG. 4b. DAQ 406 may push status data into status register 422, which may be associated with a buffer 424 (that may also be configured in memory 404) where DAQ HW 406 may store sample data (or data samples) to which the status data (or information) may correspond. Various methods may be devised for reading the status information/data pushed into memory 404 (into buffer/register 422) to detect race conditions and maintain coherency. Because the writing of memory 404 by DAQ HW 406 and the reading of memory 404 by SW (executing on processor 402) may be asynchronous and may not be atomic (where atomic refers to when a structure or a portion of a structure is accessed by a single entity at a time, for a read or write operation), a method may be devised to detect when SW is reading incoherent data. It should be noted that all references made to SW hereinafter may be interpreted as references to SW running on processor 402, for the discussed embodiments.

When atomic memory access is possible, (for example when location 432 in register/buffer 422 is a single 32-bit word on a 32-bit system and status data/information is not larger than 32 bits), the status pushing may be implemented in a straightforward manner. If status pushing is configured as an atomic access/process, DAQ 406 may never be writing the status data at the same time SW was attempting to read the status data. However, when the status data being pushed is larger than the size of the maximum atomic access (e.g. 32 bits in the present example), it may be necessary to guarantee that SW can still detect incoherent data. For example, DAQ 406 may be attempting to push 96 bits of information in a 32-bit system. The 96 bits may still represent a single status update, but with the status information including more than 32 bits. Since the system is a 32-bit system, SW may only read 32 bits at one time. SW may read the first 32 bits of the status, but DAQ 406 may overwrite the 96 bits with new status data before the SW has completed reading the entire 96 bits of status information. SW may resume the reading operation subsequent to the writing operation by DAQ 406 to obtain the last 64 bits of status data. This sequence of events, however, may result in SW obtaining incoherent data, with the first 32 bits comprising information corresponding to the first status pushed, and the other 64 bits comprising information corresponding to the second status pushed, without SW being aware that the 96-bit status data was incoherent.

In order to prevent incoherency of the status data when atomic accesses are not possible, the status data pushed into register 422 by DAQ 406 may be preceded with a status count that is incremented with every pushed status data. In other words, this count may be incremented each time new status data/information is pushed into buffer/register 422. The status count may also be appended at the end of the status data/information. The status count may provide a means for SW to determine the coherence of the status data. In addition to this, SW may perform the following sequence of reads: read the status count at the bottom of the pushed status data, block-read all the pushed status data/information, and finally, read the status count at the top of the status data. Assuming that DAQ 406 writes the data from the top down, the SW may have a guaranteed mechanism to validate the coherence of the data. If at the end of the read operation the value of the status counts (also referenced herein as status counters or status count values) match, the status data may be considered coherent. Otherwise it may be recognized as being corrupted, and the operation may be repeated. The above operation will now be described with respect to FIG. 4*b*.

Referring to FIG. 4*b*, according to one set of embodiments, DAQ 406 may push status data 432 between two locations 430 within register 422. Locations 430 (top and bottom) may contain a status count value representative of the number of DAQ HW 406 updates to memory, that is, a count of the number of times status information/data has been pushed to register 422. When DAQ 406 writes into register 422 (which, again, may be configured in memory 404), it may write the status data in a given order (i.e. ascending address order—e.g. from the top of register 422 to the bottom of register 422, shown in FIG. 4*b*), if the status data exceeds the atomic size (e.g. it is over 32 bits long in a 32-bit system. The SW may then read the status data in the opposite order (i.e. descending order—e.g. from the bottom up in register 422 to the top of register 422, shown in FIG. 4*b*). If after reading the data the two count values (i.e. the count value in the top 430 location and the count value in the bottom 430 location) match, the status data may be considered coherent. If they don't match, the status data may be interpreted as being incorrect because DAQ 406 may have overwritten some of the status data 432 with new updates while SW was reading register 422. SW may be configured to repeat the operation, i.e. read register 422 in such a case.

As previously noted, DAQ HW 406 may keep a count of the sample clocks received (or generated). This sample clock count may be pushed to register 422 along with the status data corresponding to the data acquisition (at locations 432, preferably writing in a direction opposite of which the SW may be reading register 422; i.e. from top down if SW is reading from bottom up, or from bottom up if SW is reading top down) at the time when the sample clock happens. Accordingly, locations 432 may contain status information and a sample clock count value for the data acquisition to which the status information/data corresponds, with the sample clock count value representing the most recent (highest, if counting up) sample clock count value. Each time status data is pushed to register 422 for a given acquisition, the status count value in location 430 may be incremented. The same sample count value may also be appended to the end of the sample data stream, which may all be written to memory buffer 424, the sample data at locations 434, each set of sample data followed by the count value (also referred to as sentinel data) at corresponding locations 436, immediately following the corresponding set of sample data. SW may be either notified of the sample clock event by an interrupt, or it may inspect register 422 in a loop until the status count value in locations 430 changes to the next counter value. At this point SW may inspect locations 432, and read the sample clock count. Using the sample clock count, SW may determine the expected location of the next sample in buffer 424, and access the location corresponding to the sentinel (i.e. corresponding to the sample clock count value stored with the status data in locations 432), and verify whether or not the sample is already in buffer 424. Furthermore, SW may also inspect the location of the next (subsequent) sample to verify that SW is still synchronized with DAQ HW 406. As the sample clock count value keeps changing, there is no need to clear the memory, resulting in a more deterministic and efficient method of data transfer. When status data/information pushed to buffer 422 fits into a single one of locations 432 that can be accessed atomically, and that location contains the sample clock count value, SW may not need to inspect registers 430 to see if new status information has been pushed to buffer 422, inspecting register 432 for changes instead, making the process more efficient.

The above process may be implemented for DMA transfers as follows. When using DMA to transfer data, the sentinel data (or sentinel bits) may be included in the DMA data stream in conjunction with the status pushing. The DMA stream that returns the acquired (sampled) data may insert the sentinel word at the end of each sample aggregate. The same sentinel word may also be status pushed to another location in memory, e.g. to register 422. The sentinel word may contain a sample count (also referenced as sample clock count) and error status. The sample count may be used as a reference to indicate to SW the location of the latest data within the DMA buffer. SW may wait for the status push register to advance to the next sample, and then inspect the DMA buffer in the expected location until the data is available. All of this may be performed without SW accessing DAQ HW 406. In the event of missing samples, SW may be able to simply access the latest samples, as it may have a pointer to the latest sample without a need to traverse the entire buffer, making this process deterministic. As mentioned above, also using a counter for the sentinel bit/status push indicator (stored at locations 430) may remove the need for SW to clear the buffer. Controlling the size of the DMA buffer may ensure that sentinel data in a given location is not overwritten for a reasonable period of time, and that the sentinel data is not detected in different ways.

SW may use the sample clock count value pushed by the HW to register 422 to detect latency errors. In one set of embodiments, SW may expect the sample clock count value (pushed with the status data) to increment by a specified count, e.g. by one count on each iteration. If the counter (count value) increments by more than one (i.e by more than the specified amount), the iteration may not be keeping synchronization with the HW sample clock (too slow). When reading the status data (from register 422, locations 432), the sample count value that was pushed by the HW may point to the location of the latest data sample (or sample data) acquired. When SW reads this data sample, it may also inspect the location of the next sample data after that. If the sample data is already there, it may be an indication of SW not keeping synchronization with DAQ HW 406.

Interrupt Generation and Handling

Handling interrupts originating from DAQ HW 406 may involve SW seeking information from DAQ device 406 to obtain a context of the event that caused the interrupt, and take appropriate action. This process may become especially complicated for DAQ devices having many subsystems, each of which may generate an independent and asynchronous interrupt at any time. Multiple threads of SW, independent from each other, may need to keep track of all these interrupts without affecting each other. In a real time system (e.g. a HTSP context), an added critical requirement may exist for all interrupts to take the least amount of time from the processor and get processed in the most deterministic way, reducing time uncertainty as much as possible. Desired improvements for handling interrupts may include operating without SW having to perform special reads from DAQ 406, as such reads are relatively slow and stall the processor for the whole duration of the read. It may also be desirable to allow multiple threads of SW to operate interrupts originating from different subsystems within DAQ HW 406 without the need for SW flow control tools, (e.g. semaphores or mutual exclusion algorithms), which are expensive in terms of processor time, and may add uncertainty to the SW operation. Finally, it may be beneficial to minimize the number of HW accesses (i.e. the number of accesses to DAQ 406) required to perform the usual interrupt handling operations, and to implement in multiple operations within DAQ HW 406 in the correct order.

Figure 5:
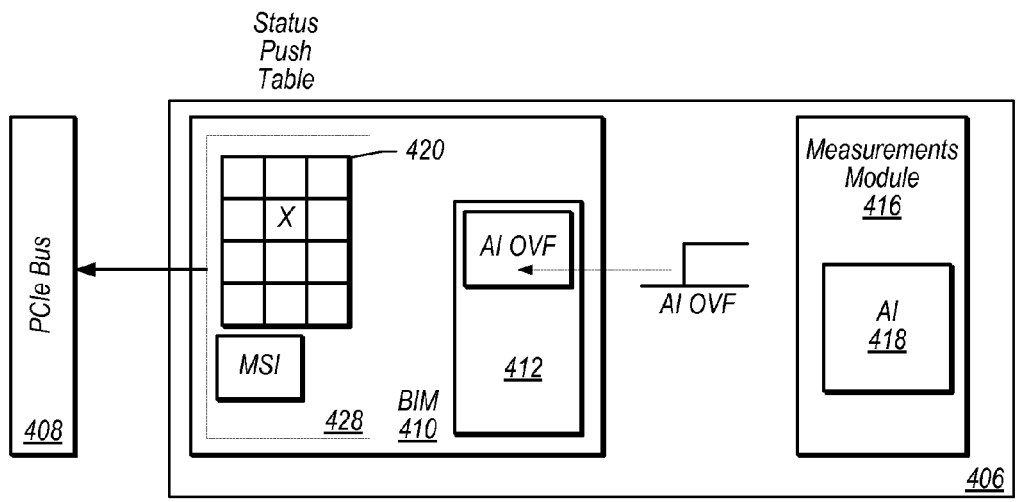
FIG. 5 shows a more detailed block diagram of one embodiment of a DAQ HW device.

FIG. 5 shows a partial diagram of an internal structure of a peripheral device, which may be a data acquisition device such as DAQ HW 406, as it interfaces with a PCIe bus 408. Although the embodiment shown in FIG. 5 includes a DAQ device and a PCIe bus, alternative embodiments may be configured with any peripheral device with functionality similar to what is disclosed herein, coupled to one of a number of different possible buses configured to facilitate data transfer to and from the peripheral device. As shown in FIG. 5, DAQ 406 may include two major components: a function module, e.g. a measurements module (MM) 416, which may be configured to obtain input data and/or generate control outputs, and a bus interface module (BIM) 410 configured to interface DAQ 406 to PCIe bus 408. MM 416 may represent an endpoint where the acquisition subsystems reside. There may actually be several acquisition subsystems active within MM 416 at any given time, but only analog input (AI) 418 is shown for the purposes of illustration. In one example, AI 418 may be generating an AI Overflow interrupt (AI_OVF), as indicated in FIG. 5. More generally, acquisition subsystems within MM 416 may generate various respective process interrupts. BIM 410 may be a centralized module for handling several bus operations for the Endpoint (MM 416), including the process interrupts generated within, and transmitted from MM 416. BIM 410 may also be handling the simple status pushing previously described.

When a subsystem (such as AI 418) within Endpoint (MM) 416 generates an interrupt (referred to herein as a process interrupt), BIM 410 may receive the process interrupt, e.g. in a processing block 412 configured to handle such interrupts, and may begin processing the interrupt by gathering interrupt status information required for handling interrupts on that particular subsystem. This gathered interrupt status information may then be pushed to host memory (e.g. into register/buffer 422) to make it available to the host processor. The gathering of information may be in the form of register reads by BIM 410 to Endpoint 406. Once the interrupt status information has been gathered, the BIM 410 may form a Status Push packet and send it to host memory to an interrupt status register, which may be register 422 (as indicated above), or it may be another buffer/register pre-reserved for this purpose. Once transmission (push) of the status packet has been performed, processing block 412 may send an interrupt message to bus interface block 428. Bus interface block 428 may include the actual bus interface communicating via PCIe bus 408. DAQ 406 may be configured to have several endpoints sending interrupts to processing block 412 and to interface block 428. When interface block 428 receives an interrupt from one endpoint (e.g. AI 418 within MM 416), it may update an internal table 420. Each entry in table 420 may represent one of the possible interrupts that the data acquisition device is configured to issue.

Several (process) interrupts may arrive to interface block 428, which may update table 420 each time it receives a new process interrupt. In the example shown in FIG. 5, the "X" within marks the location (within table 420) that may correspond to an interrupt issued by AI 418 within MM 416. At some point, interface block 428 may also push this table to an interrupt ID buffer or interrupt ID register (not shown) in host memory (e.g. memory 404) previously defined for this purpose (the interrupt ID buffer or interrupt ID register may also be similar to register 422, but dedicated to storing the interrupt table pushed by interface block 428). Subsequent to pushing the interrupt table (via bus PCIe 408 into the interrupt buffer/register in memory 404), interface block 428 may generate an interrupt (referred to as a system interrupt) based on the process interrupt(s) to the host. In one set of embodiments, the (system) interrupt may be message based (message signaled interrupt, or MSI; as shown in FIG. 5) or level based, depending on the system. After interface block 428 has transmitted this interrupt, it may suspend transmitting any more interrupts and updating interrupt table 420 until SW executing on processor 402 has acknowledged the interrupt. Upon receiving the interrupt, the SW may inspect the interrupt ID buffer/register in memory for all possible interrupts sent by interface block 428. Since there may be one or more interrupts, a SW service dispatcher may be configured to keep track of the progress of all the individual interrupt service requests (ISRs), and when all interrupts have been handled, SW may send an acknowledge to interface block 428 to allow interface block 416 to generate more interrupts as necessary.

Each ISR dispatched to handle a particular interrupt identified in the interrupt buffer/register may inspect the corresponding interrupt status buffer/register where BIM 410 has pushed the information pertaining to the interrupt. The interrupt status register may include all the information required by the ISR to handle the interrupt from the device (endpoint 416). Since all the required information to identify and service the interrupt has already been placed into the interrupt status buffer and the interrupt ID buffer, no reads by SW to the device are required.

If required, the ISR may take actions such as acknowledging, disabling or enabling the interrupt. These operations may be grouped in pairs of acknowledge-enable, and disable-acknowledge. By implementing the HW registers (interrupt status register and interrupt ID register) such that these two pairs of operations may be requested with a single access, having the HW (DAQ 406) perform these two operations in the correct order (e.g. acknowledge first then enable, and disable first then acknowledge), the number of required accesses may be minimized. Since several interrupts of the same subsystem may trigger at any given time, and different threads of SW may be handling them, implementing the interrupt status and ID registers to request operations as strobe bits (set a bit to enable, and set a different bit to disable) may enable SW to handle all these conditions without requiring SW synchronization tools such as semaphores or mutual exclusion algorithms.

Error Detection and Reporting

The subsystems of a DAQ device 406 involved in an HTSP operation may need to monitor the health of the HTSP operation, and may need to detect and report any error that occurs in a timely fashion. Furthermore, the devices may need to provide mechanisms by which the operation could recover from an error, if such recovery is possible and desired.

One example of this may be an output operation, during which the subsystem may be monitoring the data provided by SW (executing on processor 402) to ensure that the data always reaches DAQ HW 406 on time, available for the next sample clock. If this condition is not met, then an overrun error (sample clock is going too fast) may be detected and reported. Similarly, if multiple sets of data are provided to DAQ HW 406 within one sample clock period, another error may be detected. In this case the error may be indicative of write operations being performed too fast (sample clock is going too slow). DAQ 406 may be configured to detect both these errors, and to include a mechanism whereby to remember that any given error has occurred, until SW has been informed of the error, and SW acknowledges the error to DAQ HW 406. This may be referred to as sticky error reporting. The time it may take SW to be informed and acknowledge the error may be undetermined and may span several sample clock periods.

Additionally, the HW may also need to detect and report the same errors within the scope of a sample clock period. Basically, on each sample clock period, DAQ HW 406 may detect and report to SW whether, at the time of the last sample clock, the data had been received correctly. For data arriving too late, an overrun error may be reported. For too much data arriving (received) within a sample clock period, a writes-too-fast error may be reported. However, this error reporting may not require any acknowledgement from SW. Even if there were an error on the previous sample clock, if the data was on time and correct on the next sample clock, no error would be reported. This may be referred to as non-sticky error reporting.

Sticky error reporting may ensure that SW never misses the occurrence of an error, while non-sticky error reporting may provide a quick feedback mechanism to allow SW to try to recover from the error condition. The acknowledgement of the sticky error may take place in a non-time-critical fashion once SW is in error recovery mode.

Improved HW Design for Output Operations Using Counters

Figure 6A:
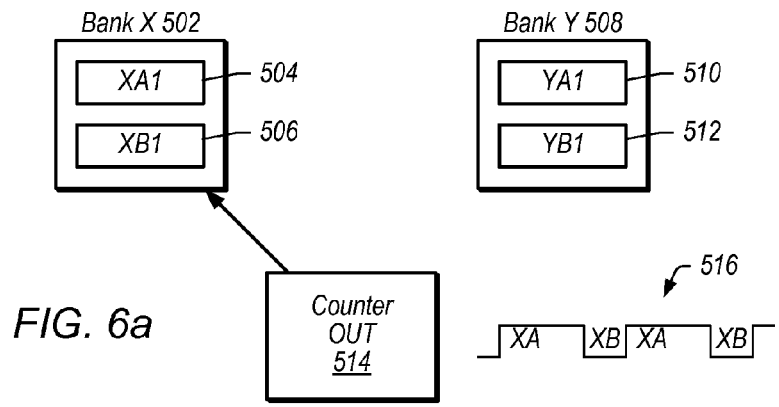
FIG. 6a shows a counter configured with two data banks within a DAQ device according to one embodiment.

FIG. 6a shows a counter 514 that may also be configured within DAQ device 406, using two data banks or load registers X 502 and Y 508, for storing currently output data and data waiting to be output. Counter 514 may generate a pulse train with the high and low periods defined in the current bank it's reading, while SW may write to the other bank. For example, counter 514 may be configured to generate signal 516 with a (high) pulse-width according to (or defined by) data (XA1) 504 stored in register 502, and a time period between the pulses defined by data (XB1) 506 also stored in register 502. Meanwhile, SW (executing on processing unit 402) may write data (YA1) 510 and (YB1) 512 to register 508, where data 510 and 512 may define the future values of the pulse-width and time elapsed between pulses. The output operation may be set up by writing values 504 and 506 in register (bank) 502. The counter may start generating a pulse train as soon as it's enabled, entering into the HTSP loop. SW may be configured to identify the currently available bank (e.g. bank 502), and write to that bank before the sample clock arrives. When the sample clock arrives, the counter may not switch banks immediately. Instead, it may first wait for the current pulse (e.g. pulse 516) to end.

The system may be configured to respond in a variety of ways when SW has new data to write before counter 514 switches over to bank 508 (i.e. switches over to the set of data intended for generating the next pulse train). A first possible response may be to overwrite bank 508, and report a late write-too-fast error, possibly overrunning the counter (if the counter switches from bank 502 to bank 508 in the middle of the sample aggregate write). A second possible response may be to have the SW wait until the counter switches banks, e.g. generating a new pulse train with the high and low periods defined by respective data 510 and 512 stored in bank 508 when switching over to bank 508, leaving the previously used bank, e.g. bank 502 available for writing the new sample aggregate for the next sample clock.

These responses may lead to certain problems, however. For example, a problem may arise during the course of the first possible response, where error conditions may not be consistent with other output systems, since an overrun may be detected at the moment the counter is switching from one bank to another, instead of being detected at the moment of the update. The same may also happen with the write-too-fast error. In the case of the second possible response, the process may become indeterministic because SW may not always have the same amount of time available to perform its operations.

Figure 6B:
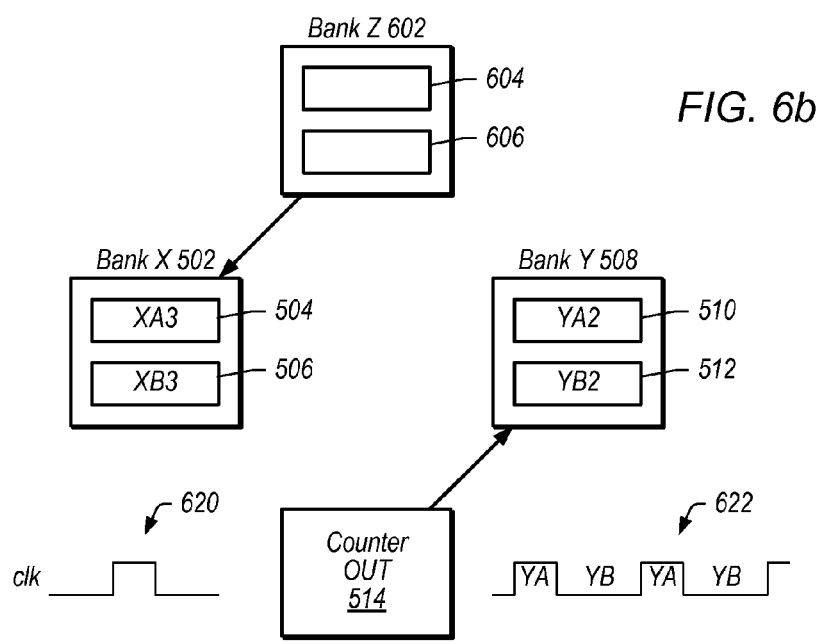
FIG. 6b shows a counter configured with three data banks within a DAQ device according to one embodiment.

In one set of embodiments, a third bank for data may be added to the counter configuration shown in FIG. 6a. The new configuration is shown in FIG. 6b, where bank (register) 602 has been added to complement banks 502 and 508. The purpose of bank 602 may be to hold the data that counter 514 may use to generate the next pulse train (or periodic signal) as soon as possible after the next sample clock. SW may write to extra bank 602 at any time after the sample clock, without risk of corrupting the current output 622. In case SW has new data to write before counter 514 has had a chance to switch from the current bank to the next bank, when the SW is notified of sample clock 620 and has the new data ready for counter 514, it may write the new data to bank 602 registers 604 and 606. Eventually, counter 514 may release one of the banks (502 and 508) and switch to the other. At the time of sample clock 620, the DAQ HW may determine the appropriate bank (the bank not in use at the time) for the data and may copy data into the free bank from bank 602 just in time for counter 514 to switch to the now updated bank, and begin generating the new waveform.

At the time of the sample clock, if data in bank 602 is not complete or not coherent, an overrun may be reported, and counter 514 may be instructed to not switch from one bank to another. If bank 602 was written with two sample aggregates between updates, a writes-too-fast error may be reported. After the sample clock, even if counter 514 hasn't switched from one bank to another bank yet, bank 602 may be ready to receive data for the next sample clock.

Benefits of adding bank 602 therefore include consistency of the error conditions. SW writing more than one sample aggregate (one sample aggregate may include a respective value for high period and a respective value for low period, e.g. XA3 in register 504 and XB3 in register 506) between two sample clocks may be considered a write-too-fast condition. If SW is in the middle of writing a sample aggregate when the sample clock arrives, it may be considered an overrun condition, and the output may remain unchanged as counter 514 may be instructed to not switch from one bank to another. Another benefit is ensuring that the process remain deterministic. SW may write the next sample aggregate without having to wait for the unpredictable amount of time counter 514 may take to switch from one bank to another, subsequent to sample clock 620.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for sampling and storing data in a system comprising a host processing unit and system memory, the method comprising:
   a data acquisition (DAQ) device acquiring first data samples;
   in response to one or more specified events in the DAQ device, the DAQ device writing DAQ hardware (HW) status information corresponding to the first data samples into a first location in the system memory;
   in response to said writing the DAQ HW status information, incrementing a count value by a specified amount;
   the DAQ device writing the first data samples into a second location in the system memory;
   writing the count value into a third location in system memory and into a fourth location in system memory;
   reading, in order, the third, first, and fourth locations in system memory;
   if the count value read in the third location in the system memory is not the same as the count value read in the fourth location in the system memory, designating the DAQ HW status information as incoherent, otherwise designating the DAQ HW status information as coherent;
   the host processing unit accessing the first location in the system memory and reading the DAQ HW status information;
   the host processing unit accessing the second location in the system memory according to the DAQ HW status information, and reading the first data samples from the second location in the system memory; and
   the host processing unit using the first data samples to perform one or more system operations.

2. The method of claim 1, wherein in response to said designating the DAQ HW status information as incoherent, repeating said reading the third, first, and fourth locations in the system memory.

3. The method of claim 1, wherein said writing the count value into the fourth location in the system memory is performed prior to said writing the first status information into the first location in the system memory, which is performed prior to said writing the count value into the third location in the system memory.

4. The method of claim 1, wherein the one or more specified events comprise a timing event.

5. The method of claim 4, wherein the timing event comprises one of:
   a sample clock being asserted; and
   an interrupt.

6. The method of claim 1, further comprising:
   keeping a count of sample clocks during said acquiring the first data samples;
   writing a count value corresponding to the count of sample clocks to the second location in the system memory subsequent to said writing the first data samples;
   writing the count value into the first location in the system memory in conjunction with said writing the DAQ HW status information into the first location in the system memory; and
   accessing the second location in the system memory according to the DAQ HW status information and the count value.

7. The method of claim 6, wherein the count value corresponds to a relative location of the first data samples within the first location in the system memory.

8. A system comprising:
   a processing unit;
   a data acquisition (DAQ) device coupled to the processing unit and the system memory via a first bus, and configured to acquire data samples;
   system memory coupled to the processing unit via a second bus, and configured to store data, and program instructions:
   wherein the DAQ device is further configured to:
      in response to one or more specified events in the DAQ, write DAQ hardware (HW) status information corresponding to the acquired data samples and comprising information associated with the one or more specified events into a first location in the system memory over the first bus;
      keep a count of sample clocks while acquiring the data samples;
      write the acquired data samples into a second location in the system memory over the first bus;
      write a count value corresponding to the count of sample clocks to the second location in the system memory over the first bus subsequent to writing the acquired data samples into the second location in the system memory;
      write the count value into the first location in the system memory in conjunction with writing the DAQ HW status information into the first location in the system memory;
   wherein the program instructions are executable by the processing unit to:
      read the DAQ HW status information from the first location in the system memory over the second bus;
      access the second location in system memory over the second bus;
      read at least a portion of the data samples from the second location in the system memory over the second bus according to the DAQ HW status information and the count value.

9. The system of claim 8, wherein the DAQ device comprises one or more acquisition subsystems configured to couple to respective one or more external devices, and further configured to perform one or more of:
   acquire the data samples from the respective one or more external devices; or
   generate control signals configured to control the respective one or more external devices.

10. The system of claim 8, wherein the DAQ device is further configured to:
    generate process interrupts intended for the system;
    gather interrupt information required to handle the process interrupts;

write the interrupt information over the first bus into one of:
- a third location in the system memory; or
- the first location in the system memory;

write identification information identifying the process interrupts into a fourth location in the system memory over the first bus; and generate and transmit a system interrupt over the first bus, once the interrupt information and the identification information have been transmitted over the first bus.

11. The system of claim 10, wherein the DAQ device is further configured to suspend transmitting system interrupts until the system interrupt it has already transmitted over the first bus has been acknowledged.

12. The system of claim 10, wherein the program instructions are further executable by the processing unit to:
- receive the system interrupt transmitted over the first bus by the DAQ device;
- upon receiving the system interrupt, inspect the fourth location in system memory to identify process interrupts that need to be handled based on the identification information; and
- acknowledge to the DAQ device when the process interrupts that need to be handled have been handled according to the interrupt information.

13. A method for sampling and storing data in a system comprising a host processing unit and system memory, the method comprising:
- a data acquisition (DAQ) device acquiring first data samples;
- in response to one or more specified events in the DAQ device, the DAQ device writing DAQ hardware (HW) status information corresponding to the first data samples into a first location in the system memory;
- the DAQ device writing the first data samples from the DAQ device into a second location in the system memory;
- the DAQ device keeping a count of sample clocks during said acquiring the first data samples;
- the DAQ device writing a count value corresponding to the count of sample clocks to the second location in the system memory subsequent to said writing the first data samples; and
- the DAQ device writing the count value into the first location in the system memory in conjunction with said writing the DAQ HW status information into the first location in the system memory;
- wherein the DAQ HW status information and the count value are useable by the host processing unit to read the first data samples from the second location in the system memory.

14. A method for sampling and storing data in a system comprising a host processing unit and system memory, the method comprising:
- a data acquisition (DAQ) device acquiring first data samples;
- the DAQ device keeping a count of sample clocks during said acquiring the first data samples;
- in response to one or more specified events in the DAQ device, the DAQ device writing DAQ hardware (HW) status information corresponding to the first data samples into a first location in the system memory;
- the DAQ device writing the first data samples into a second location in the system memory;
- the DAQ device writing a count value corresponding to the count of sample clocks to the second location in the system memory subsequent to said writing the first data samples;
- the DAQ device writing the count value into the first location in the system memory in conjunction with said writing the DAQ HW status information into the first location in the system memory;
- the host processing unit accessing the first location in the system memory and reading the DAQ HW status information;
- the host processing unit accessing the second location in the system memory according to the DAQ HW status information and the count value, and reading the first data samples from the second location in the system memory; and
- the host processing unit using the first data samples to perform one or more system operations.

15. The method of claim 14 wherein in response to said designating the DAQ HW status information as incoherent, repeating said reading the third, first, and fourth locations in the system memory.

16. The method of claim 14, wherein said writing the count value into the fourth location in the system memory is performed prior to said writing the first status information into the first location in the system memory, which is performed prior to said writing the count value into the third location in the system memory.

17. The method of claim 14, wherein the one or more specified events comprise a timing event.

18. The method of claim 17, wherein the timing event comprises one of:
- a sample clock being asserted; and
- an interrupt.

19. The method of claim 14, wherein the count value corresponds to a relative location of the first data samples within the first location in the system memory.

* * * * *